United States Patent

Schebitz et al.

[11] Patent Number: 6,074,500
[45] Date of Patent: Jun. 13, 2000

[54] METHOD FOR PRODUCING A METAL COMPONENT MADE UP OF TWO PARTIAL ELEMENTS

[75] Inventors: Michael Schebitz, Eschweiler; Franz-Reiner Carduck, Geilenkirchen, both of Germany

[73] Assignee: FEV Motorentechnik GmbH & Co. KG, Germany

[21] Appl. No.: 09/124,971

[22] Filed: Jul. 30, 1998

[30] Foreign Application Priority Data

Jul. 31, 1997 [DE] Germany .............. 197 33 135

[51] Int. Cl.⁷ .................................. B23K 103/02
[52] U.S. Cl. .............. 148/528; 148/529; 148/534; 228/262.42
[58] Field of Search .................... 148/528, 529, 148/534, 516; 228/262.42, 135

[56] References Cited

U.S. PATENT DOCUMENTS

| | | | |
|---|---|---|---|
| 848,161 | 3/1907 | Dierig . | |
| 969,610 | 9/1910 | Dawson . | |
| 4,223,826 | 9/1980 | Usui | 228/208 |
| 5,725,682 | 3/1998 | Hashimoto | 148/220 |
| 5,830,585 | 11/1998 | Hosoe et al. | 428/615 |

FOREIGN PATENT DOCUMENTS

| | | |
|---|---|---|
| 40 08 102 | 9/1991 | Germany . |
| 42 44 627 | 6/1994 | Germany . |

OTHER PUBLICATIONS

DD–B.: Petrunin, I.E., "Handbuch Der Löttechnik" [Soldering Technology Manual] 1991, pp. 106, 107.

*Primary Examiner*—George Wyszomierski
*Assistant Examiner*—Janelle Morillo
*Attorney, Agent, or Firm*—Venable; George H. Spencer; Robert Kinberg

[57] ABSTRACT

A method for producing a metal component which is made up of at least two partial elements with differing material properties is distinguished in that a first partial element made of a steel material, which can be tempered, is preassembled in a recess in a second partial element made of a magnetic iron material of low retentivity. A copper based solder is applied to the preassembled component at the recess in the transition area between the first partial element and the second partial element. Thereafter, the component is heated to a temperature which lies above the melting temperature of the solder. After the liquid solder has been distributed in a contact area of the two partial elements, the component is cooled. The component is then brought at least once to the tempering temperature of the steel material of the first partial element, is maintained at this temperature for a predetermined length of time and then is completely cooled.

16 Claims, No Drawings

METHOD FOR PRODUCING A METAL COMPONENT MADE UP OF TWO PARTIAL ELEMENTS

CROSS-REFERENCE TO RELATED APPLICATIONS

The right of priority is claim with respect to German application No. DE 197 33 135.1 filed Jul. 31, 1997 in Germany, the disclosure of which is incorporated herein by reference.

FIELD OF THE INVENTION

The invention relates to a method for producing a metal component which is made up of at least two partial elements with differing material properties.

BACKGROUND OF THE INVENTION

Producing a uniform metal component from at least two partial elements, wherein the partial elements must have differing material properties because of operational requirements, can be difficult. For example, this applies when the component as a whole is dynamically stressed, in particular stressed by impact or blows, so that the connection between the two partial elements is stressed by impact or blows in the same way. This can occur, for example, in connection with a component wherein the one partial element consists of a simple iron material and the other partial element of a high-quality steel material. In continuous operations, a purely mechanical connection by means of a shrinkage fit or press fit, or by riveting, is not sufficiently resistant to frequent, in particular very frequently alternating impact or blow stresses. A welded connection is also not possible in connection with such uses in view of the considerable structural changes in the partial element made of high-quality steel material.

OBJECT AND SUMMARY OF THE INVENTION

It is an object of the invention to create a method of the type identified at the outset, by means of which a solid connection between two partial elements can be generated, wherein the disadvantages mentioned are avoided.

The above and other objects are accomplished in accordance with the invention by the provision of a method for producing a metal component which is made up of at least two partial elements with differing material properties, comprising: forming a first one of the two partial elements from a steel material that can be tempered; forming a second one of the two partial elements from a magnetic iron material of low retentivity; creating a recess in the second one of the partial elements; preassembling the component by insertion of the first partial element into the recess in the second partial element; applying a copper based solder to the preassembled component at the recess in a transition area between the first partial element and the second partial element; thereafter heating the component to a temperature above a melting temperature of the solder for distributing the solder in a contact area of the two partial elements; and cooling the component after the liquid solder has been distributed in the contact area of the two partial elements and then bringing the component at least once to a tempering temperature of the steel material of the first partial element and maintaining the component at this temperature for a predetermined length of time before completely cooling the component.

DETAILED DESCRIPTION OF THE INVENTION

According to the method of the invention the component is preassembled by the insertion of the first partial element, IS which is made of a steel material which can be tempered, into a recess formed in the second partial element, which is made of a magnetic iron material of low retentivity. A copper based solder is applied to the preassembled component at the recess in the transition area between the first partial element and the second partial element, and thereafter the component is heated to a temperature above the melting temperature of the solder. After the liquid solder has been distributed in the contact area of the two partial elements, the component is cooled and hardened, and thereafter it is brought at least once to the tempering temperature of the steel material of the first partial element and maintained at this temperature for a predetermined length of time and then completely cooled.

By means of this method it is possible to solidly connect a component made of two partial elements of such different material properties as exhibited by a steel material which can be tempered, on the one hand, and an iron material of low magnetic retentivity on the other, and also to temper the steel material to the desired quality after the soldering process. Use is made of the advantage that the melting temperature of the solders which can be considered for such highly-stressed connections lies considerably above the hardening and tempering temperature of the steel material which can be tempered, so that at the end of the soldering process, that is, after distribution and solidification of the solder, the further heat treatment can be performed in the connecting area without the sturdiness of the soldered location being affected.

Since normally the solder qualities to be considered have a defined melting point, it is also possible to control the temperature so that the micro-structural changes in the material which can be tempered can be taken into consideration. In this way it may be useful, depending on the type of the steel material which can be tempered, to perform heating in stages, and in the course of this to maintain the temperature at a predetermined level during an interim temperature stage in order to let the formation of the structure in the steel material to take place perfectly. Such a dwell time can extend over several minutes, depending on the steel material. Since the solder for all practical purposes has a melting point, i.e. it liquefies at a defined temperature, and is distributed in the contact area between the two partial elements, it is sufficient if the peak temperatures required for the soldering process are only maintained briefly, in the range of seconds or minutes, and if thereafter the cooling process is initiated and the solder solidifies immediately to provide the solid connection.

In this regard, it is useful if, after the solder has been distributed, the component is initially rapidly cooled to approximately 30° C. and is thereafter heated to the tempering temperature of the steel material. Then the tempering temperature is maintained for a time, wherein the length of time depends on the type of steel material used. In this way soldering and tempering can be provided practically in one operational step.

The method in accordance with the invention can be employed particularly advantageously in connection with a component wherein the first partial element is rod-shaped and the second partial element is plate-shaped, and wherein the recess for receiving the first partial element is a bore. Such a component is usefully brought to the melting temperature of the solder with the first partial element oriented vertically.

In the one embodiment of the invention it is provided that soft iron is used as the material for the preferably plate-shaped second partial element. It is assured by this means that in appropriate applications the area of the components formed by the second partial element can be magnetically reversed by the effect of changing magnetic fields without a noticeable remanence, and accordingly can also be subjected to rapidly changing magnetic fields.

In a further embodiment of the invention it is provided that a high-speed steel is used as the material for a preferably rod-shape first partial element. Such steel can be tempered perfectly and essentially evenly over the entire cross section. For example, the use of a high-speed steel of a composition in accordance with ISO-DIN Material No. 1.3343 resulted overall in hardness values lying between 58 and 62 HRC after tempering. Thus, the first partial element has a correspondingly high degree of hardness and therefore also a high degree of wear resistance, such as is required, for example, for the guidance of a component which can be moved back and forth. The use of a so-called cold work steel or tool steel can also be useful, for example a tool steel of a composition in accordance with ISO-DIN Material No. 1.2379.

When selecting the solder, it is practical to chose a solder whose melting point is so high that the temperatures required for the subsequent tempering of the steel material for structural transformation are reached. For example, when using the above mentioned high-speed steel in accordance with ISO-DIN Material No. 1.3343 it is useful, if the melting temperature of the solder at 1180° C. lies slightly above the temperature required for the austenizing of this high-speed steel. To austenize a cold work steel, such as was also mentioned by way of example above, a temperature of approximately 1020 to 1080° C. would be sufficient, so that in this case a solder with a lower melting temperature can be used.

Taking into consideration, on the one hand, the temperatures required for the tempering of the steel material and, on the other-hand, the required solidity of the soldered connection, the use of a copper based solder is useful. In this case it is possible either to employ pure copper, or a copper alloy, for example $CuSn_6$. The iron and steel materials used are very well wetted by this solder, so that with a width of the gap between the two partial elements to be connected with each other of 1 to 60 μm, preferably 25 to 50 μm, a perfect connection over the entire surface is formed. In this case the solder can be embodied as a prefabricated bendable element, for example as a wire ring, in connection with a round cross section of the first partial element, which is pushed on the first partial element and positioned in the edge area of the recess. In this connection it is useful if an edge of the recess in the second partial element is provided with a bezel for applying the solder, so that a "melt bath" is created in this area, which runs off into the gap of the connecting area.

In a practical embodiment of the invention, it is furthermore provided that, in the connection area, the interior dimensions of the recess in the second partial element and the exterior dimensions of the first partial element are of such a size that seating with play is provided. Because of this a sufficient gap width for receiving the liquid solder is provided.

With a rod-shaped partial element having a round cross section in particular it is useful, if the first partial element is provided with preferably three centering protrusions in the connecting area which, while maintaining a gap between the two partial elements, cause a press fit. This allows a geometrically exact preassembly of the component, wherein a sufficient pressing force is provided via the centering protrusions for manipulating the preassembled component.

The soldering process and the tempering of the steel material, in particular, if they are performed in one operational step usefully takes place in a vacuum furnace. Cooling after soldering can be performed in a protective gas, wherein a cooling process in protective gas above atmospheric pressure is also possible. It can be sufficient as a rule to subject the steel material to only one tempering treatment. When using the above mentioned high-speed steel it can be useful to subject the component to a second tempering treatment.

By means of the above described method it is possible, for example, to produce components for an electromagnetic function, wherein the second partial element is made of soft iron and is exposed to the effects of magnetic fields. When used in an electromagnetic function, the rod-shaped partial element is used as a bearing and therefore must be embodied to have wear-resistance. It is possible, depending on the employment, that such a component can also be charged with very high, alternating magnetic forces, so that in the course of a large impact, stresses become active, which then correspondingly are also transmitted to the connection between the partial element made of soft iron and the partial element made of tempered steel.

The invention has been described in detail with respect to preferred embodiments, and it will now be apparent from the foregoing to those skilled in the art, the changes and modifications may be made without departing from the invention in its broader aspects, and the invention, therefore, as defined in the appended claims, is intended to cover all such changes and modifications as to fall within the true spirit of the invention.

What is claimed is:

1. A method for producing a metal component which is made up of at least two partial elements with differing material properties, comprising:

forming a first one of the two partial elements from a steel material that is capable of being tempered;

forming a second one of the two partial elements from a magnetic iron material of low retentivity;

creating a recess in the second partial element;

preassembling the component by insertion of the first partial element into the recess in the second partial element;

applying a copper based solder to the preassembled component in a transition area between the first partial element and the second partial element;

thereafter heating the component to a temperature above a melting temperature of the solder for distributing the solder; and cooling the component after the liquid solder has been distributed in a contact area of the two partial elements and then bringing the component at least once to a tempering temperature of the steel material of the first partial element and maintaining the component at this temperature for a length of time sufficient to solidly connect said two partial elements and to temper said steel material before completely cooling the component.

2. The method in accordance with claim 1, wherein following distribution of the solder in the heating step, the cooling step includes rapidly cooling the component to approximately 30° C. and thereafter heating the component to the tempering temperature of the steel material and maintaining the component at this temperature for said length of time.

3. The method in accordance with claim 1, wherein the heating step includes orienting the first partial element vertically.

4. The method in accordance with claim 1, wherein the step of forming the second partial element includes using a soft iron as the magnetic material and embodying the second partial element as a plate-shaped element.

5. The method in accordance with claim 1, wherein the step of forming the first partial element includes using a high-speed steel as the steel material and embodying the first partial element as a rod-shaped element.

6. The method in accordance with claim 1, wherein the step of forming the first partial element includes using a tool steel as the steel material and embodying the first partial element as a rod-shaped element.

7. The method in accordance with claim 1, wherein the applying step includes using copper as the solder.

8. The method in accordance of claim 1, wherein the applying step includes using a copper alloy as the solder.

9. The method in accordance of claim 8, wherein the copper alloy comprises $CuSn_6$.

10. The method in accordance with claim 1, wherein the applying step includes applying the solder in a form of a prefabricated bendable element.

11. The method in accordance with claim 1, wherein the creating step includes providing an edge of the recess in the second partial element with a bezel for applying the solder.

12. The method in accordance with claim 1, including providing an interior dimension of the recess in the second partial element and an exterior dimension of the first partial element with such a size that in a connecting area of the first and second partial elements the first and second partial elements are seated with play relative to one another.

13. The method in accordance with claim 12, including providing the first partial element with centering protrusions in the connecting area which, while maintaining a gap between the two partial elements, cause a press fit.

14. The method in accordance with claim 13, wherein the gap has a width of about 1 to about 60 $\mu$m.

15. The method in accordance with claim 13, wherein the gap has a width of about 25 to 50 $\mu$m.

16. The method according to claim 13, wherein three centering protrusions are provided.

* * * * *